(12) United States Patent
Chu et al.

(10) Patent No.: US 6,744,819 B1
(45) Date of Patent: Jun. 1, 2004

(54) SYSTEM AND METHOD FOR SELECTING A DATA TRANSMISSION MODE

(75) Inventors: Keith T. Chu, Laguna Niguel, CA (US); Sverrir Olafsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 706 days.

(21) Appl. No.: 09/656,804

(22) Filed: Sep. 7, 2000

(51) Int. Cl.[7] ............................................... H04B 14/04
(52) U.S. Cl. ....................................... 375/242; 370/204
(58) Field of Search .............................. 370/204, 205; 375/220, 222, 219, 242; 709/203, 209

(56) References Cited

U.S. PATENT DOCUMENTS

| | | | | |
|---|---|---|---|---|
| 4,571,737 A | * | 2/1986 | Nishitani et al. .............. | 375/27 |
| 5,778,024 A | * | 7/1998 | McDonough ................ | 375/216 |

* cited by examiner

*Primary Examiner*—Wellington Chin
*Assistant Examiner*—Brenda Pham

(57) ABSTRACT

Various systems and methods are provided in a client, a line card or other conversion device, and a server to implement either a linear or a nonlinear PCM transmission mode for data communication in a data communications network. The client and the server negotiate with each other to establish a specific data communications mode. The data communications mode may be, for example, linear pulse code modulation (PCM) or nonlinear PCM. To begin, the client informs the server whether it supports nonlinear PCM, linear PCM, or both. In light of the clients communications capability and the modes supported by the server itself, the server responds by informing the client which data communications mode is to be used. In the case that both the client and server support linear and nonlinear PCM, the server informs the client that linear PCM is to be used, such being more conducive to accurate high-speed data communication. In the case that one of either the client or the server only supports nonlinear mode, the server informs the client that nonlinear PCM is to be employed. Assuming that linear PCM is specified as the data communications mode between the client and the server, the server then transmits a message to the line card that informs the line card that linear PCM is to be used.

24 Claims, 5 Drawing Sheets

SYSTEM AND METHOD FOR SELECTING A DATA TRANSMISSION MODE

TECHNICAL FIELD

The present invention is generally related to the field of data communications and, more particularly, is related to a system and method for selecting a data transmission mode in a data communications link between a client device and a server.

BACKGROUND OF THE INVENTION

In data communications networks, it is often the case that a client device is in data communication with a server over various networks, etc. In one typical network arrangement, a client device may be linked to a server through both a local loop and a digital network. Specifically, such a client device may include a modem that is coupled to a line card in a central office through the local loop. The communication across the local loop is typically of an analog nature due to the limitations of the local loop as a data communications medium. The line card, in turn, is coupled to the digital network such as the Internet, etc. The line card thus provides access to the digital network for the client device. Using this network arrangement, a client device may communicate with a server or other device on the digital network. Essentially, an analog-to-digital transformation occurs in the line card for upstream data traffic and a digital-to-analog transformation occurs in the line card for downstream traffic.

In a given instance of communication between the client device and the server, a specific mode of data transmission may be established therebetween. The mode of data transmission may include nonlinear or linear pulse code modulation (PCM) depending upon the individual capabilities of the client device and the server. Generally, it is necessary that the line card support the particular mode of data transmission that is employed by the client device and the server. Unfortunately, cases can occur in which both the client device and the server support a particular mode of data transmission that is not supported by the line card. Consequently, the client device and the server are prevented from using the mode of data transmission not supported by the line card, resulting in data transmission that is less than optimum.

SUMMARY OF THE INVENTION

In light of the foregoing discussion, the present invention provides for a data communications network including respective systems and methods in a client, a line card or other conversion device, and a server to implement either a linear or a nonlinear PCM transmission mode for data communication.

According to the present invention, the client and the server negotiate with each other to establish a specific data communications mode. The data communications mode may be, for example, linear pulse code modulation (PCM) or nonlinear PCM. To begin, the client informs the server whether it supports nonlinear PCM, linear PCM, or both. In light of the client communications capability and the modes supported by the server itself, the server responds by informing the client which data communications mode is to be employed for further data communication. In the case that both the client and server support linear and nonlinear PCM, the server informs the client that linear PCM is to be used, such being more conducive to accurate high-speed data communication. In the case that one of either the client or the server only supports nonlinear mode, the server informs the client that nonlinear PCM is to be employed.

Assuming that linear PCM is specified as the data communications mode between the client and the server, the server then transmits a message to the line card that informs the line card that linear PCM is to be used. If the line card is capable of performing linear PCM, upon receiving the message from the server, the line card transitions to linear PCM to conduct the data exchange between the client and the server. If the line card does not support linear PCM, then it ignores the message from the server.

Any failure on the part of the line card to implement linear PCM as mandated by the server is discovered during subsequent startup negotiations between the client and the server. If such a failure is discovered, the client and the server revert back to nonlinear data communication accordingly. One advantage provided by the present invention is that clients and servers or other data communications devices may communicate with each other using an optimum data communications mode.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Moreover, in the drawings, like reference numerals designate corresponding parts throughout the several views.

DETAILED DESCRIPTION OF THE INVENTION

Figure 1:
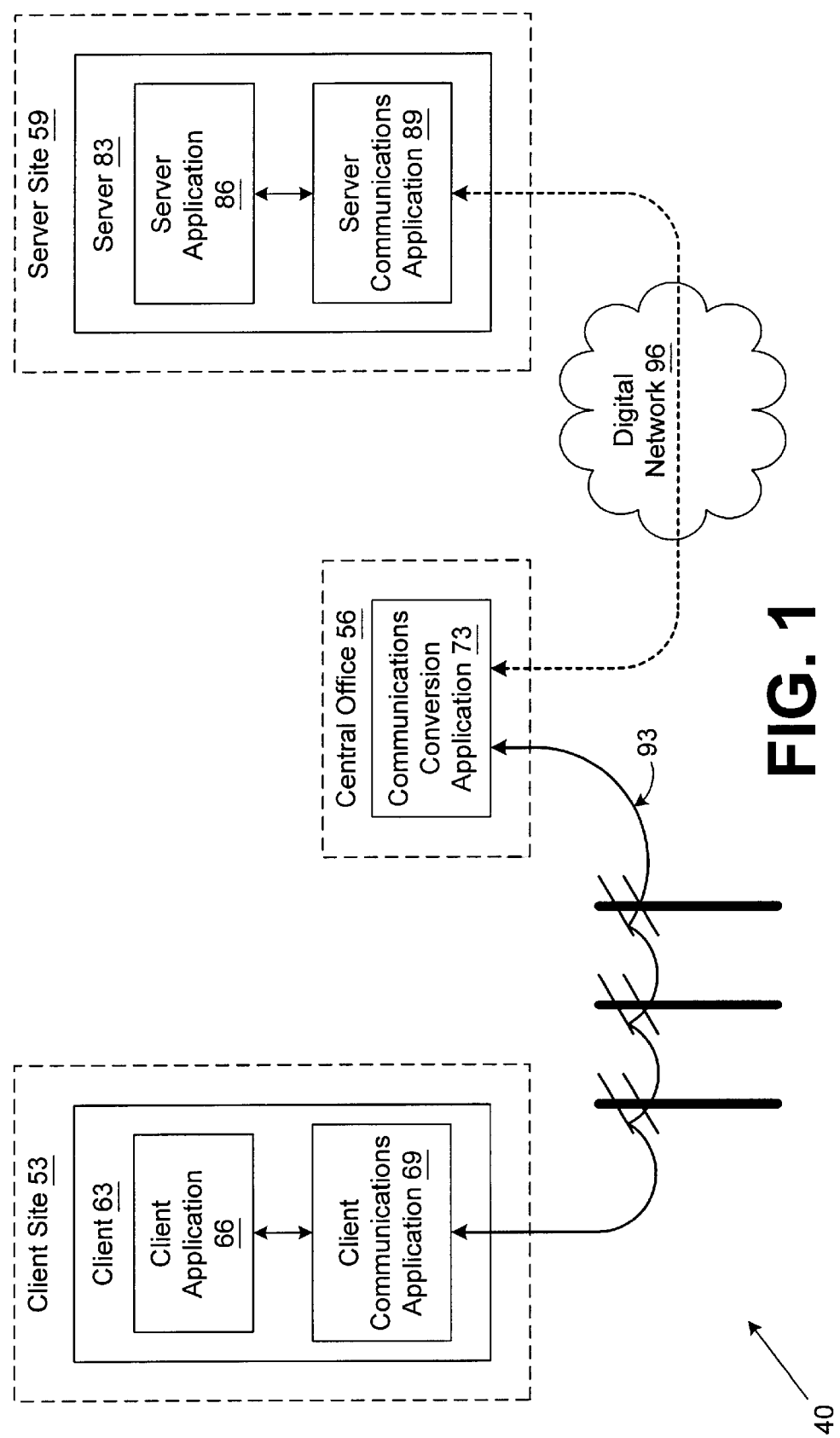
FIG. 1 is a functional block diagram of a communications network according to the present invention.

With reference to FIG. 1, shown is a data communications network 40 according to an embodiment of the present invention. The data communications network 40 includes a client site 53, a central office 56, and a server site 59. The client site 53 includes a client 63 that features a client application 66 and a client communications application 69. Located at the server site 59 is a server 83 featuring a server application 86 and a server communications application 89. The client 63 and the server 83 may each be, for example, a computer system or other suitable devices, etc. The central office 56 includes a communications conversion application 73. The client communications application 69 and the server communications application 89 may be, for example, a modem or network card, etc. The communications conversion application 73 may include, for example, a line card or other suitable device.

The client 63 is in data communication with the communications conversion application 73 over a local loop 93. Also, the server 83 is in data communications with the communications conversion application 73 via a digital network 96. Thus, the communications conversion application 73 bridges the gap from the local loop 93 to the digital network 96 to allow the client 63 to communicate with the server 83.

The client application 66, client communications application 69, server application 86, server communications application 89, and the communications conversion application 73 may be implemented, for example, in terms of software executed by a respective processor based circuit. Alternatively, the applications 66, 69, 86, 89, and 73 may also be embodied, for example, in hardware or a combination of software and hardware. If embodied in hardware, the applications 66, 69, 86, 89, and 73 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The client and server applications 66 and 86 may be any applications that are executed via the client 63 and the server 83, respectively. The client and server applications 66 and 86 also communicate to each other through the client communications application 69 and the server communications application 89.

Next, a general overview of the operation of the data communications network 40 is provided. In a data communications exchange between the client site 53 and the server site 59, the client 63 and the server 83 negotiate to establish the data communications link in terms of protocol including modulation type, baud rate, and other parameters. The physical pathway of the communications link traces over the local loop 93, through the communications conversion application 73, and across the digital network 96. In establishing the data communications link between the client 63 and the server 83, generally there are several phases of a startup negotiation sequence, for example, that may be implemented so that the client 63 and the server 83 can determine the protocol parameters relating to the data exchange. One such startup sequence may begin with a first phase or Phase I that implements an ITU-T recommendation V.8 exchange as set forth by the International Telecommunication Union, dated May 1999 that is generally known to those with ordinary skill in the art.

According to the V.8 standard, for example, the client 63 transmits a call menu sequence to the server 83. In reply, the server 83 transmits a joint menu sequence back to the client 63. The call menu sequence and the joint menu sequence are employed by the client 63 and the server 83 to establish general capabilities and other parameters of the data communication to take place. Thereafter, Phase II of the startup negotiation between the client 63 and the server 83 begins in which both devices probe and range the data communications link. In most cases, this is done by transmitting a known sequence from the client 63 to the server 83 and vice-versa to discover the degradation of the known sequence due to distortion caused by the local loop and the network 96. Then, Phase III is commenced in which training begins between the client 63 and the server 83. Next, Phase IV of the startup negotiation is executed in which the data rate negotiations take place between the client 63 and the server 83 to establish an appropriate rate of exchange of data. Typically a 70 millisecond silent period is imposed between each Phase of the above negotiation sequence.

By way of the startup negotiations as discussed above, the client 63 and the server 83 implement a particular modulation type with which to transmit the data between themselves. As is generally known in the art, the local loop 93 provides particular challenge to transmit data from the central office 56 to the client site 53 in that it is not generally hospitable to high-speed data communications. Each local loop 93 has it's own particular characteristics based on its length, age, and other parameters that affects the data communication transmitted therethrough. Generally, there may be two types of data modulation, for example, that may be employed by the client 63, the server 83, and the communications conversion application 73. These include, for example, nonlinear pulse code modulation (PCM) and linear PCM modulation as known in the art. Generally, linear PCM modulation is preferred for data communication over typical nonlinear modulation schemes used in the telephone networks.

As is known in the art, nonlinear PCM modulation involves the nonlinear distribution of the discreet magnitude levels and translating between the digital to analog signal. Conversely, linear PCM modulation involves evenly spaced discreet levels at which a digital signal is transformed into an analog one and vice-versa. A detailed description of these particular modes is omitted herein as both are generally understood by those with ordinary skill in the art.

Typically it has been the case that linear PCM modulation is not used between clients 63 and servers 83 because it is not supported by existing communications conversion applications 73 such as line cards. According to the present invention, the client 63, communications conversion application 73, and the server 83 all support both linear and nonlinear PCM transmission modes. In particular, the present invention provides for negotiation between the client 63 and the server 83 to ascertain whether linear or nonlinear PCM transmission mode is to be employed for a particular data communication session. The present invention also provides for communication to the communications conversion application 73 to cause it to implement the PCM transmission mode negotiated by the client 63 and the server 83.

In order to establish the particular transmission mode, the client 63 first sends a PCM transmission capability indicator in the call menu, for example, to the server 83. Assuming that a nonlinear PCM transmission mode is employed as a default, the PCM transmission capability indicator informs the server 83 whether the client supports a linear PCM transmission mode. In a first scenario, assuming the server 83 only supports a nonlinear PCM transmission mode, then it transmits a joint menu back to the client 63 that specifies a nonlinear PCM transmission mode is to be employed. In a second scenario, the server 83 supports both transmission modes but the client 63 only supports a nonlinear PCM transmission mode as indicated by the PCM transmission capability indicator. In this situation, the server 83 transmits a joint menu back to the client 63 that indicates that a nonlinear PCM transmission mode is to be employed for the duration of the data exchange.

In a third scenario the client 63 supports both transmission modes as indicated by the PCM transmission capability indicator and the server 83 supports both transmission modes. In this scenario, the server 83 transmits a joint menu back to the client that specifies that all communication is to be performed in a linear PCM transmission mode. Thereafter, the server 83 transmits a linear mode selection sequence to the communications conversion application 73 in an attempt to cause it to switch to a linear PCM transmission mode. This is done between Phase I and Phase II of the startup negotiations after the joint menu is transmitted from the server 83 to the client 63.

Assuming the third scenario is undertaken, it is then necessary to determine whether the communications conversion application 73 has made the transition to a linear PCM transmission mode. This is because in many cases, the communications conversion application 73 may only support a nonlinear PCM transmission mode and may not react to the linear mode selection sequence from the server 83. The client 63 and the server 83 determine whether the communications conversion application 73 is operating in a linear PCM transmission mode, for example, by executing the Phase II of the startup negotiations. Phase II entails probing and ranging on the part of the client 63 and the server 83. If the communications conversion application 73 continues to employ a nonlinear PCM transmission mode, a significant amount of distortion and unacceptable signal degradation results that is detectable by the client 63 and the server 83.

If it is determined that the communications conversion application 73 does not support a linear PCM transmission mode or that an unacceptable signal results in linear mode, then the client 63 and the server 83 transition back to a nonlinear PCM transmission mode. Also, the server 83 transmits a nonlinear mode selection sequence to the communications conversion application 73 to ensure that it switches back to a nonlinear PCM transmission mode. If the communications conversion application 73 does not support the linear PCM transmission mode, the nonlinear mode selection sequence is ignored.

Ultimately, once data communications is established, the client and server applications 63 and 83 communicate to each other through the client communications application 69 and the server communications application 89.

Given the above overview, the following discussion with reference to FIGS. 2–5 describes an exemplary implementation of the data communications network 40. The implementation of FIGS. 2–5 is described in terms of software. However, the present invention may also be implemented in terms of hardware and/or a combination of hardware and software.

Figure 2:
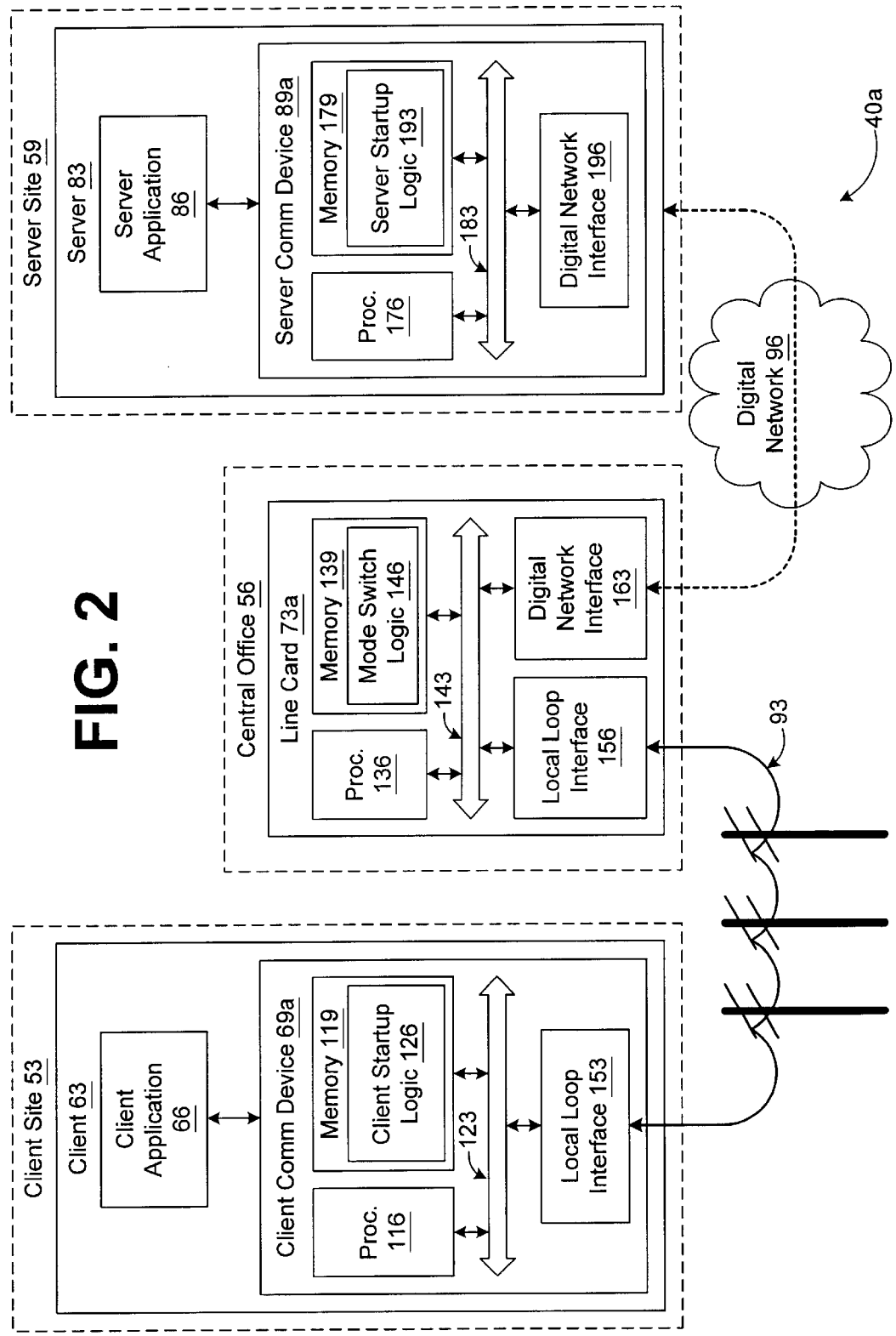
FIG. 2 is a block diagram of a communications network that provides an exemplary implementation of the data communications network of FIG. 1 according one aspect of the present invention.

With reference to FIG. 2, shown is a data communications network 40a that provides a software implementation, for example, of the data communications network 40 of FIG. 1. According to the data communications network 40a, the client 63 includes the client application 66 and a client communications device 69a. The server 83 includes the server application 86 and a server communications device 89a. The central office 56 includes a line card 73a as shown. Thus, the client communications device 69a, server communications device 89a, and the line card 73a are specific implementations of the client communications application 69, the server communications application 89, and the communications conversion application 73, respectively.

The client communications device 69a includes a processor circuit that includes a processor 116 and a memory 119, both of which are coupled to a local interface 123. Together the processor 116, memory 119, and the local interface 123 may be included within a single integrated circuit such as a digital signal processor or other equivalent circuit. The local interface 123 may comprise, for example, a data bus with an accompanying control bus or an appropriate network such as is the case with a multiple processor circuit. Stored in the memory 119 and executable by the processor 116 is client startup logic 126 that controls the functionality of the client communications device 69a according to an embodiment of the invention.

The line card 73a includes a processor 136 and a memory 139, both of which are coupled to a local interface 143 that may comprise a data bus with an accompanying control bus or other similar interface. As was the case with the client device, the processor 136, memory 139, and local interface 143 may be contained within a single integrated circuit such as a digital signal processor or other equivalent circuit. In addition, mode switch logic 146 is stored in the memory 139 and is executable by the processor 136 to perform the various functionality of the line card 73a according to the present invention.

The client communications device 69a includes a local loop interface 153 and the line card 73a includes a local loop interface 156. The local loop interfaces 153 and 156 provide a link between a local loop 93 to the appropriate local interfaces 123 and 143, as shown. The local loop 93 may comprise, for example, a two wire pair between the client site 53 and the central office 56, as is generally known by persons who possess ordinary skill in the art. The line card 73a in the central office 56 also includes a digital network interface 163 that links the local interface 143 to a digital network 96.

In addition, the server communications device 89a includes a processor circuit having a processor 176 and a memory 179, both of which are coupled to a local interface 183. Similar to the local interfaces 123 and 143, the local interface 183 may comprise a data bus and associated control bus, as known in the art. Also, the processor 176, memory 179 and local interface 183 may be contained within a single integrated circuit such as a digital signal processor or other equivalent circuit. The server communications device 89a further includes server startup logic 193 that is stored in the memory 179 and executable by the processor 176 according to an embodiment of the present invention. The server communications device 89a also includes a digital network interface 196 that links the local interface 183 to the digital network 96. Thus, the line card 73a and the server communications device 89a are able to communicate through their respective digital network interfaces 163 and 196 by way of the digital network 96. Likewise, the line card 73a provides a link to the local loop 93 so that the server communications device 89a can communicate with the client communications device 69a.

The memories 119, 139, and 179 may comprise, for example, both volatile and nonvolatile memory components. Volatile components are those that do not retain data values upon loss of power. Nonvolatile components retain data upon a loss of power. Thus, the memories 119, 139, and 179 may comprise, for example, random access memory (RAM), read-only memory (ROM), flash RAM, hard disk drives, floppy disk drives, compact disk drives, tape drives, and/or other memory components, or a combination of any two or more of these memory components. For example, in the case that the memories 119, 139, and 179 comprise part of an integrated circuit, ROM or flash RAM components be employed in addition to other memory components.

In addition, the processors 116, 136, and 176 and the memories 119, 139, and 179 may be, for example, electrically, optically, or wirelessly coupled to their respective interfaces 123, 143, and 183. In this regard, the processors 116, 136, 176, memories 119, 139, 179 and local interfaces 123, 143, and 183 may be either electrical or optical components. The memories 119, 139, and 179 may be magnetic as well.

Figure 3:
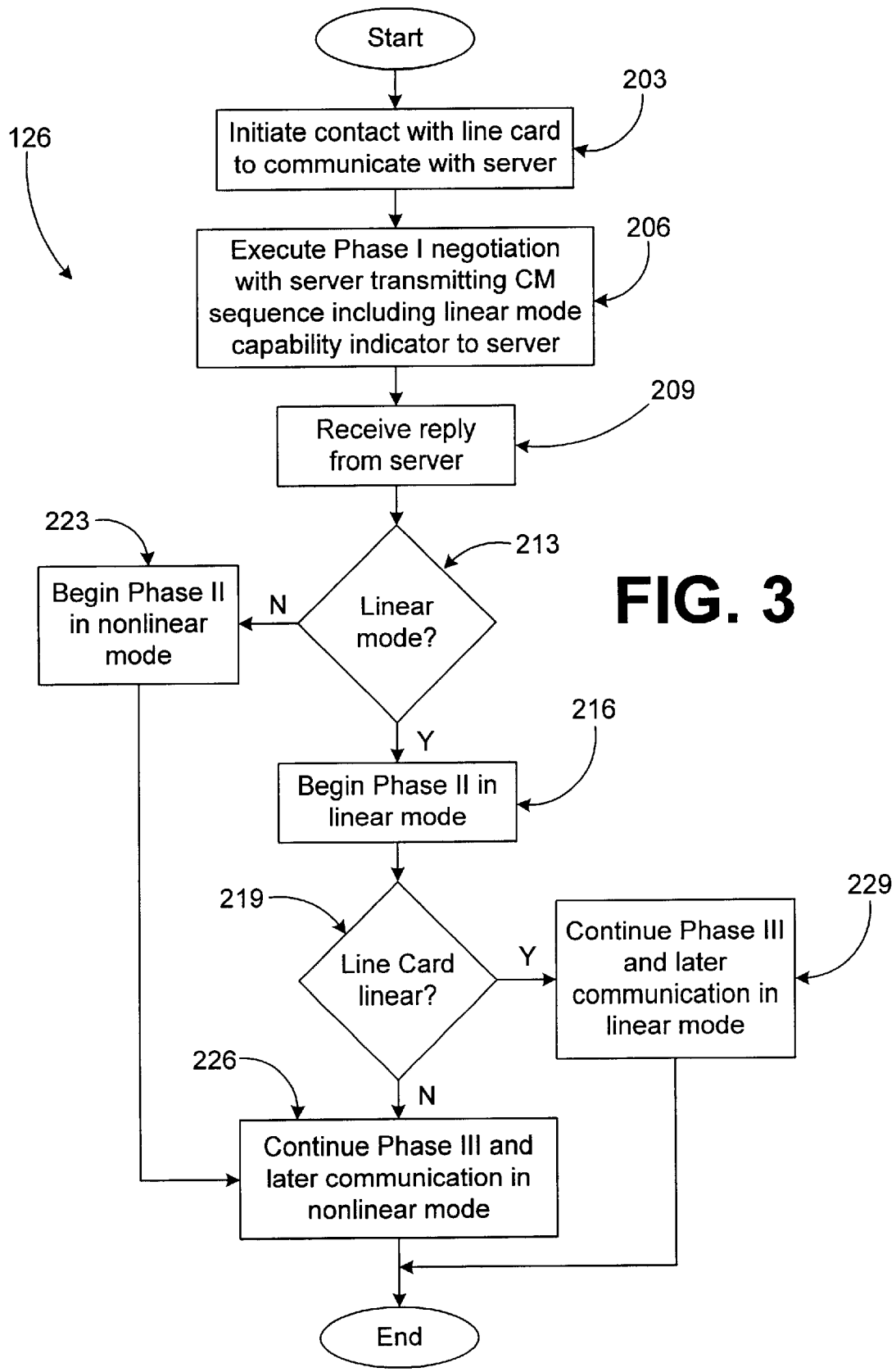
FIG. 3 is a flow chart of client startup logic executed by a client device in the data communications network of FIG. 2.

Turning then to FIG. 3, shown is a flow chart of the client startup logic 126 according to an embodiment of the present invention. Alternatively, the blocks of the flow chart of FIG. 4 may be viewed as steps of a method executed in the client communications device 69*a*. The client startup logic 126 is executed in the client communications device 69*a* during the startup negotiations with the server communications device 89*a* to establish the data transmission between the client 63 and the server 83. Beginning with block 203, the client startup logic 126 initiates communication with the line card 73*a* in order to establish an avenue by which it may communicate with the server 83. After the communications link is established, the client startup logic 126 progresses to block 206 in which a Phase I negotiation, for example, is executed with the server communications device 89*a*. The client communications device 69*a* transmits the call menu sequence that includes the linear PCM transmission mode capability indicator to the server communications device 89*a*. Note that the indicator could be a particular bit or value within a field in the call menu sequence, or other signal, as appropriate. Thereafter, in block 209, the client startup logic 126 receives the joint menu sequence from the server communications device 89*a* as a reply to the call menu sequence previously transmitted in block 206.

Then, in block 213 the client startup logic 126 determines whether a linear PCM transmission mode is to be employed in communicating with the server communications device 89*a* based upon the mode of transmission indicated in the joint menu received from the server communications device 89*a* in block 209. If the linear PCM transmission mode is to be employed in block 213, then the client startup logic 126 moves to block 216. In block 216, Phase II of the startup negotiation between the client communications device 69*a* and the server communications device 89*a* is commenced using a linear PCM transmission mode. The client startup logic 126 then progresses to block 219. If in block 213 the joint menu indicates that a nonlinear PCM transmission mode is to be employed, then the client startup logic 126 moves to block 223. In block 223, Phase II negotiations between the client communications device 69*a* and the server communications device 89*a* are commenced in nonlinear PCM transmission mode. Thereafter, the client startup logic 126 progresses to block 226 as shown.

Assuming the client startup logic 126 has reached block 219 after beginning Phase II of the startup negotiations in block 216, the client logic 123 determines whether the line card 73*a* is capable of implementing a linear PCM transmission mode. This may be ascertained, for example, by detecting an unacceptable level of distortion in the received data signal from the server communications device 89*a*. If in block 219 it is determined that the line card 73*a* does not support a linear PCM transmission mode, then the client startup logic 126 progresses to block 226. In block 226 Phase III and all later communication between the client communications device 69*a* and the server communications device 89*a* is performed in a nonlinear PCM transmission mode. On the other hand, in block 219, if it is determined that the line card 73*a* does support a linear PCM transmission mode, then the client startup logic 126 moves to block 229. In block 229, Phase III and later communication between the client communications device 69*a* and the server communications device 89*a* is undertaken in the linear PCM transmission mode. Thereafter, the client startup logic 126 ends.

Figure 4:
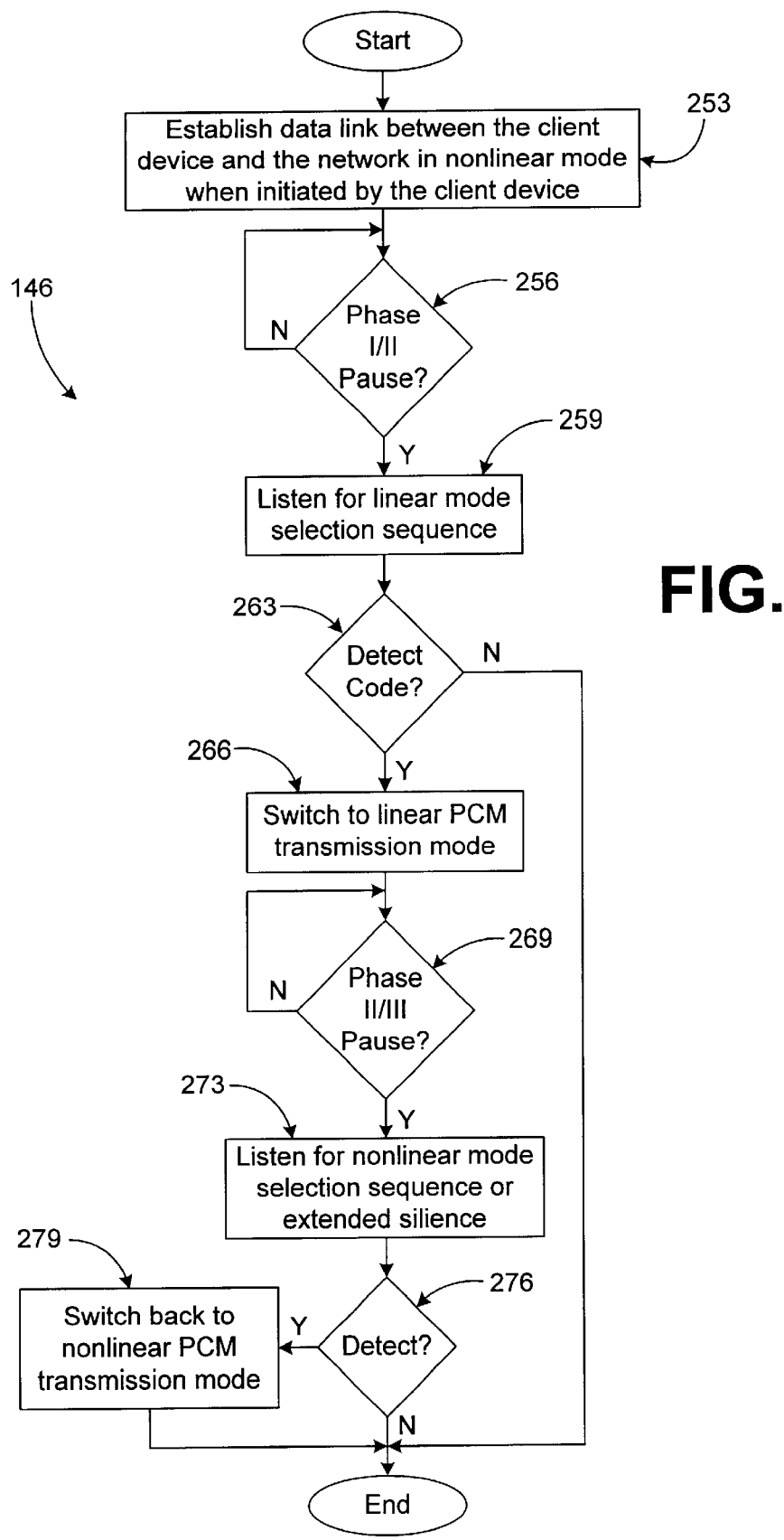
FIG. 4 is a flow chart of mode switch logic executed by a line card in the data communications network of FIG. 2.

With reference to FIG. 4, shown is a flowchart of the mode switch logic 146 according to another embodiment of the present invention. Alternatively, the blocks of the flow chart of FIG. 4 may be viewed as steps of a method executed in the line card 73*a*. The mode switch logic 146 is executed by the processor 136 of the line card 73*a* to switch between linear and nonlinear PCM transmission modes in the line card 73*a*. Using one of these modes, the line card 73*a* relays data from the local loop 93 to the digital network 96 during the course of data communication between the client communications device 69*a* and the server communications device 89*a*. The mode switch logic 146 stored in the memory 139 is executed, for example, in conjunction with other logic that is stored in the memory 139 to perform the various functionality of the line card 73*a*. For the sake of expediency, any other logic executed in the line card 73*a* beyond the mode switch logic 146 is not discussed in detail, such being generally understood by those with ordinary skill in the art.

Beginning with block 253, the mode switch logic 146 establishes a data link between the client communications device 69*a* and the digital network 96 in a nonlinear PCM transition mode when initiated by the client communications device 69*a* as described above. Thereafter, in block 256 the mode switch logic 146 determines, for example, whether the first 70-millisecond pause between Phase I and Phase II of the startup negotiations between the client communications device 69*a* and the server 83 has begun. If so, then the mode switch logic 146 progresses to block 259, in which it listens for the linear mode selection sequence transmitted from the server communications device 89*a* through the digital network 96. Thereafter, in block 263, if the linear mode selection sequence is detected, then the mode switch logic 146 progresses to block 266. Otherwise, the mode switch logic 146 ends as shown.

In block 266, given that a linear mode selection sequence has been detected in block 263, the mode switch logic 146 thus switches the operation of the line card 73*a* to a linear PCM transmission mode. Thereafter, the mode switch logic 146 moves to block 269 at which it waits for the occurrence of the second 70 millisecond pause, for example, between Phase II and Phase III of the startup negotiations. Once the second pause has commenced, the mode switch logic 146 progresses to block 273 in which it listens for a nonlinear mode selection sequence from the server communications device 89*a*. In block 276, if the nonlinear mode selection sequence is detected or if an extended silence period of 100 milliseconds or other suitable period of time, for example, is detected, then the mode switch logic 146 moves to block 279. Otherwise, the mode switch logic 146 ends and the line card 73*a* thereafter performs its functions with respect to further data exchange in the linear PCM transmission mode. In block 279, assuming that the nonlinear mode selection sequence has been detected as transmitted from the server communications device 89*a*, the mode switch logic 146 switches back to the nonlinear PCM transmission mode and thereafter, all transmission is executed in the nonlinear PCM transmission mode. Also, if an extended period of silence of greater than 100 milliseconds, for example, is detected, the mode switch logic 146 transitions back to nonlinear PCM transmission mode as well. This is to ensure a return to a normal network state in case the modem connection is lost. Thereafter, the mode switch logic 146 ends accordingly.

Figure 5:
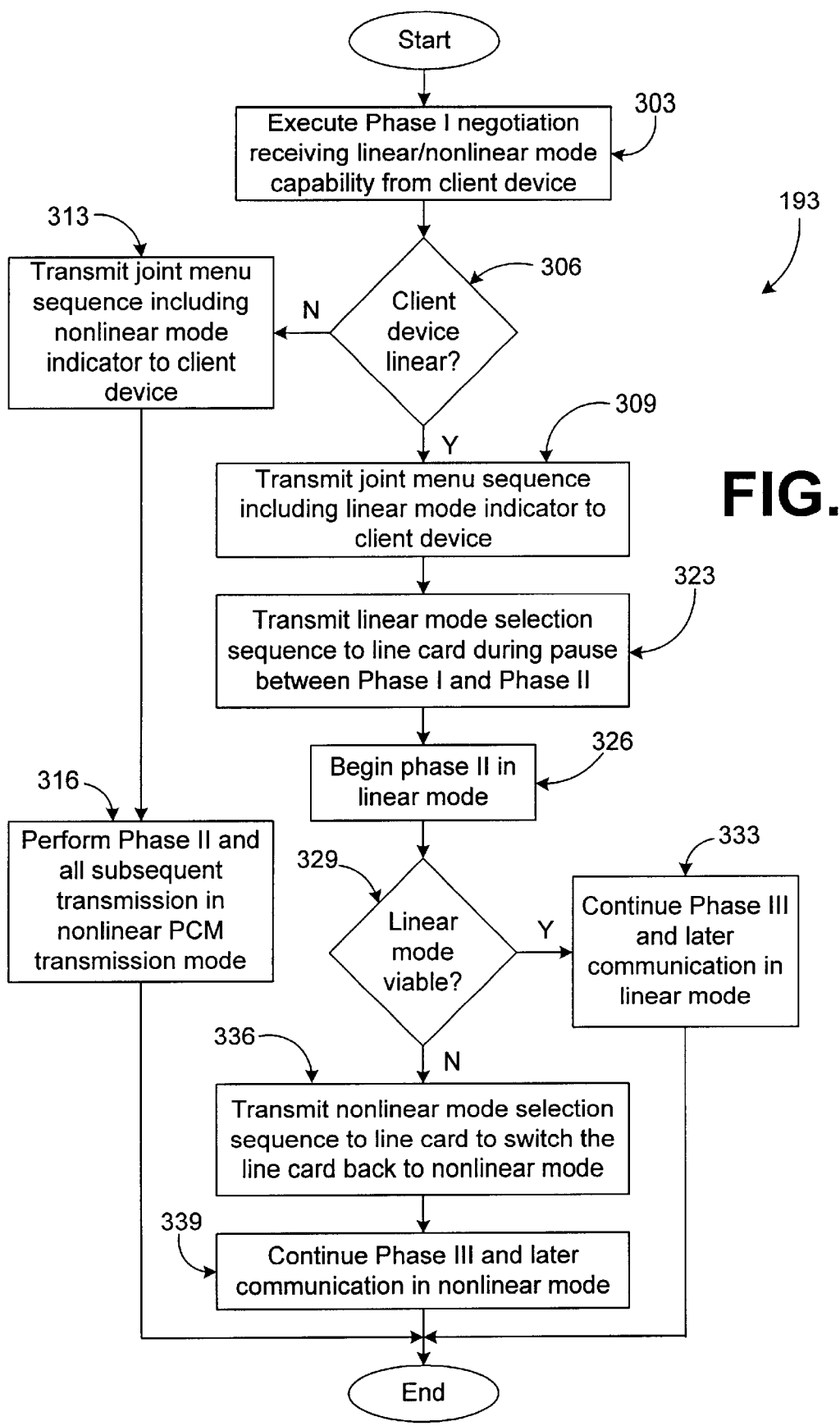
FIG. 5 is a flow chart of server startup logic executed by a server in the data communications network of FIG. 2.

With reference to FIG. 5, shown is a flowchart of the server startup logic 193 according to an embodiment of the present invention. Alternatively, the blocks of the flow chart of FIG. 5 may be viewed as steps of a method executed in the server communications device 89a. The server startup logic 193 is executed by the server communications device 89a to perform the startup negotiations with the client communications device 69a and to transmit signals to the line card 73a to control the particular transmission mode executed by the line card 73a. Beginning with block 303, the server startup logic 193 executes Phase I negotiations with the client communications device 69a. In particular, the server communications device 89a receives an indicator from the client communications device 69a in the call menu that indicates whether the client communications device 69a supports a linear PCM transmission mode in addition to the default nonlinear PCM transmission mode. Thereafter, in block 306 the server startup logic 193 determines whether the client communications device 69a supports a linear PCM transmission mode. If this is the case, then the server startup logic 193 moves to block 309. Otherwise, the server startup logic 193 moves to block 313 in which it transmits a joint menu sequence including an indication that a nonlinear PCM transmission mode is to be employed in further negotiations with the client communications device 69a. Thereafter, the server startup logic 193 progresses to block 316 in which Phase II and all subsequent negotiations and data communication with the client communications device 69a are performed in the nonlinear PCM transmission mode.

Assuming that the server startup logic 193 moves to block 309 from block 306, in block 309 the server startup logic 193 causes a joint menu sequence to be transmitted to the client communications device 69a as part of the Phase I negotiations. The joint menu sequence transmitted includes a linear PCM transmission mode indicator that informs the client communications device 69a that such mode is to be used in future communications. Thereafter, the server startup logic 193 progresses to block 323 in which a linear mode selection sequence is transmitted to the line card 73a during the 70 millisecond pause between Phase I and Phase II, for example, of the startup negotiations with the client communications device 69a. The linear mode selection sequence may comprise, for example, a predefined sequence of binary digits that are transmitted in a manner so that the silence that exists between Phase I and Phase II is not interrupted generally, but the line card 73a can detect the signal at the same time.

For example, the data transmitted according to PCM generally transmits eight bit words at a time. According to PCM, each digital word is translated into a corresponding voltage level, thereby resulting in an analog signal. The most significant bit of each word is generally reserved as a sign bit. The predefined sequence may thus be transmitted using the sign bit for consecutive words. In particular, the sequence would amount to transmitting plus or minus "0" that, in terms of signal magnitude, is still silence. The predefined sequence may be repeated to distinguish it from noise. Thereafter, the server startup logic 193 moves to block 326, in which the server communications device 89a begins Phase II of the startup negotiations with the client communications device 69a in the linear PCM transmission mode.

Then, in block 329, the server startup logic 193 determines whether the linear PCM transmission mode is viable between the client communications device 69a and the server communications device 89a. This may be done, for example, by examining the quality of the data transmissions from the client communications device 69a during the Phase II negotiations. If in block 329 the linear PCM transmission mode provides acceptable transmission quality, then the server startup logic 193 progresses to block 333. In block 333, Phase III of the startup negotiations and all later data communication with the client communications device 69a is executed in the linear PCM transmission mode. Thereafter, the server startup logic 193 ends as shown.

If, however, in block 329 the linear PCM transmission mode is unacceptable, then the server startup logic 193 progresses to block 336, in which a nonlinear mode selection sequence is transmitted to the line card 73a during the 70 millisecond silence period between Phase II and Phase III. The nonlinear mode selection sequence causes the line card 73a to switch back to the nonlinear PCM transmission mode. Finally, the server startup logic 193 then moves to block 339, in which Phase III of the startup negotiations and all later communication with the client communications device 69a is performed in the nonlinear PCM transmission mode.

Although the particular logic 126, 146, and 193 of the present invention is embodied in software as discussed above, as an alternative the logic 126, 146, and 193 may also be embodied in hardware or a combination of software and hardware. If embodied in hardware, the logic 126, 146, and 193 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3, 4, and 5 show the architecture, functionality, and operation of an implementation of the logic 126, 146, and 193. If embodied in software, each block may represent a module, segment, or portion of code that comprises one or more executable instructions to implement the specified logical function(s). If embodied in hardware, each block may represent a circuit or a number of interconnected circuits to implement the specified logical function (s). Although the flow charts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. It is understood that all such variations are within the scope of the present invention.

Also, the logic 126, 146, and 193 can be embodied in any computer-readable medium for use by or in connection with an instruction execution system. The instruction execution system may be a computer/processor based system or other system that can fetch or obtain the logic from the computer-readable medium and execute the instructions contained therein. In the context of this document, a "computer-readable medium" can be any medium that can contain, store, or maintain the logic 126, 146, and 193 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc read-only memory (CDROM).

Many variations and modifications may be made to the above-described embodiment(s) of the invention without departing substantially from the spirit and principles of the invention. All such modifications and variations are intended to be included herein within the scope of the present invention.

What is claimed is:

1. A system in a server for selecting a mode of communication, comprising:

a processor coupled to a local interface;

a memory coupled to the local interface; and mode selection logic stored in the memory and executable by the processor, the mode selection logic comprising:

logic to establish one of a nonlinear pulse code modulation (PCM) transmission mode and a linear PCM transmission mode between the server and a client device via a local loop; and logic to transmit a linear mode selection sequence to a line card that drives a PCM data signal over the local loop to cause the line card to implement the linear PCM transmission mode.

2. The system of claim 1, wherein the mode selection logic further comprises logic to transmit a linear PCM transmission mode indicator to the client device to establish the linear PCM transmission mode between the server and the client device.

3. The system of claim 1, wherein the logic to establish one of a nonlinear PCM transmission mode and a linear PCM transmission mode between the server and a client device over a local loop further comprises logic to ascertain a linear PCM transmission capability of the client device based upon a call menu sequence received therefrom.

4. The system of claim 1, wherein the mode selection logic further comprises logic to detect a failure of the line card to implement the linear PCM transmission mode.

5. A system in a server for selecting a mode of communication, comprising:

means for establishing one of a nonlinear pulse code modulation (PCM) transmission mode and a linear PCM transmission mode between the server and a client device via a local loop; and means for transmitting a linear mode selection sequence to a line card that drives a PCM data signal over the local loop to cause the line card to implement the linear PCM transmission mode.

6. The system of claim 5, further comprising means for transmitting a linear PCM transmission mode indicator to the client device to establish the linear PCM transmission mode between the server and the client device.

7. The system of claim 5, wherein the means for establishing one of a nonlinear PCM transmission mode and a linear PCM transmission mode between the server and a client device over a local loop further comprises means for ascertaining a linear PCM transmission capability of the client device based upon a call menu sequence received therefrom.

8. The system of claim 5, further comprising means for detecting a failure of the line card to implement the linear PCM transmission mode.

9. A method in a server for selecting a mode of communication, comprising the steps of:

establishing one of a nonlinear pulse code modulation (PCM) transmission mode and a linear PCM transmission mode between the server and a client device via a local loop; and transmitting a linear mode selection sequence to a line card that drives a PCM data signal over the local loop to cause the line card to implement the linear PCM transmission mode.

10. The method of claim 9, further comprising the step of transmitting a linear PCM transmission mode indicator to the client device to establish the linear PCM transmission mode between the server and the client device.

11. The method of claim 9, wherein the step of establishing one of a nonlinear PCM transmission mode and a linear PCM transmission mode between the server and a client device over a local loop further comprises the step of ascertaining a linear PCM transmission capability of the client device based upon a call menu sequence received therefrom.

12. The method of claim 9, further comprising the step of detecting a failure of the line card to implement the linear PCM transmission mode.

13. A system in a line card for selecting a mode of communication, comprising:

a processor coupled to a local interface;

a memory coupled to the local interface;

a local loop interface coupled to the local interface, the local loop interface being configured for coupling to a local loop;

a digital interface coupled to the local interface, the digital interface being configured for coupling to a digital network; and network access logic stored in the memory and executable by the processor, the network access logic comprising:

logic to establish a data communications link between a client device on the local loop and a server on the digital network using a nonlinear pulse code modulation (PCM) transmission mode;

logic to detect a linear mode selection sequence transmitted from the server over the digital network; and logic to implement a linear PCM transmission mode upon detection of the linear mode selection sequence from the server.

14. A system in a line card for selecting a mode of communication, comprising:

means for establishing a data communications link between a client device on a local loop and a server on a digital network using a nonlinear pulse code modulation (PCM) transmission mode;

means for detecting a linear mode selection sequence transmitted from the server over the digital network; and means for implementing a linear PCM transmission mode upon detection of the linear mode selection sequence from the server.

15. A method in a line card for selecting a mode of communication, comprising the steps of:

establishing a data communications link between a client device on a local loop and a server on a digital network using a nonlinear pulse code modulation (PCM) transmission mode;

detecting a linear mode selection sequence transmitted from the server over the digital network; and implementing a linear PCM transmission mode upon detection of the linear mode selection sequence from the server.

16. A system in a client device for selecting a mode of communication, comprising:

a processor coupled to a local interface;

a memory coupled to the local interface; and mode selection logic stored in the memory and executable by the processor, the mode selection logic comprising:

logic to transmit a call menu sequence to a server by way of a local loop and a digital network, the local loop being coupled to the digital network by a line card, the call menu sequence including an indication of a linear pulse code modulation (PCM) transmission capability of the client device; and logic to implement one of a nonlinear PCM transmission mode and a linear PCM transmission mode with the server based upon a linear PCM transmission mode indicator received from the server.

17. The system of claim 16, wherein the mode selection logic further comprises:

logic to detect a failure of the line card to implement the linear PCM transmission mode; and logic to transition to a nonlinear PCM transmission mode with the server upon detection of the failure of the line card to implement the linear PCM transmission mode.

18. The system of claim 17, wherein logic to detect a failure of the line card to implement the linear PCM transmission mode further comprises logic to detect an unacceptable level of distortion in a received data signal from the server.

19. A system in a client device for selecting a mode of communication, comprising:

means for transmitting a call menu sequence to a server by way of a local loop and a digital network, the local loop being coupled to the digital network by a line card, the call menu sequence including an indication of a linear pulse code modulation (PCM) transmission capability of the client device; and means for implementing one of a nonlinear PCM transmission mode and a linear PCM transmission mode with the server based upon a linear PCM transmission mode indicator received from the server.

20. The system of claim 19, further comprising:

means for detecting a failure of the line card to implement the linear PCM transmission mode; and means for transitioning to a nonlinear PCM transmission mode with the server upon detection of the failure of the line card to implement the linear PCM transmission mode.

21. The system of claim 20, wherein the means for detecting a failure of the line card to implement the linear PCM transmission mode further comprises means for detecting an unacceptable level of distortion in a received data signal from the server.

22. A method in a client device for selecting a mode of communication, comprising the steps of:

transmitting a call menu sequence to a server by way of a local loop and a digital network, the local loop being coupled to the digital network by a line card, the call menu sequence including an indication of a linear pulse code modulation (PCM) transmission capability of the client device; and implementing one of a nonlinear PCM transmission mode and a linear PCM transmission mode with the server based upon a linear mode transmission indicator received from the server.

23. The method of claim 22, further comprising the step of:

detecting a failure of the line card to implement the linear PCM transmission mode; and transitioning to a nonlinear PCM transmission mode with the server: upon detection of the failure of the line card to implement the linear PCM transmission mode.

24. The method of claim 23, wherein the step of detecting a failure of the line card to implement the linear PCM transmission mode further comprises the step of detecting an unacceptable level of distortion in a received data signal from the server.

* * * * *

UNITED STATES PATENT AND TRADEMARK OFFICE
CERTIFICATE OF CORRECTION

PATENT NO. : 6,744,819 B1
DATED : June 1, 2004
INVENTOR(S) : Chu et al.

It is certified that error appears in the above-identified patent and that said Letters Patent is hereby corrected as shown below:

Column 14,
Line 33, delete the mark ":" that appears between the words "server" and "upon".

Signed and Sealed this

Eighteenth Day of January, 2005

JON W. DUDAS
*Director of the United States Patent and Trademark Office*